(No Model.)
J. W. CASON.
HARROW.
No. 488,425. Patented Dec. 20, 1892.
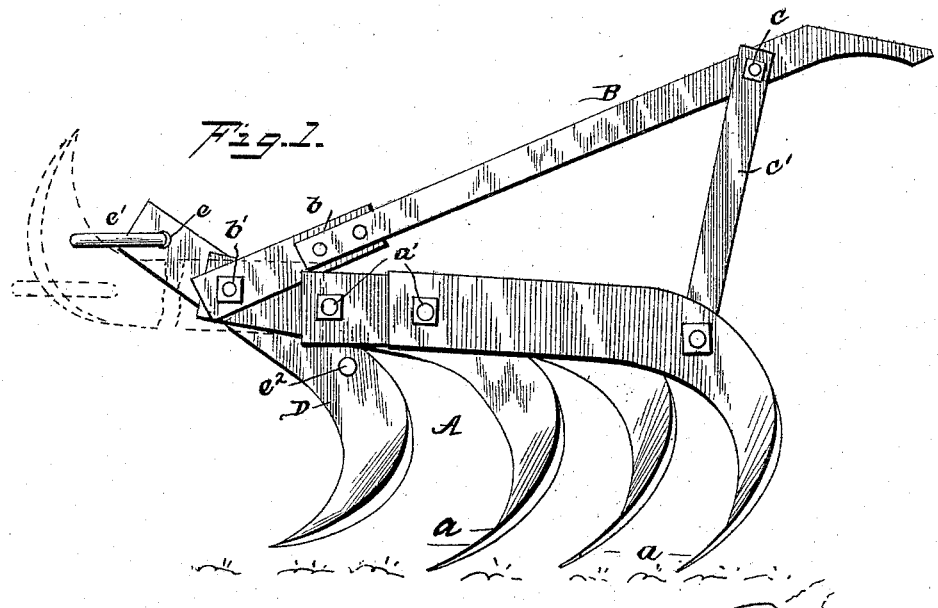
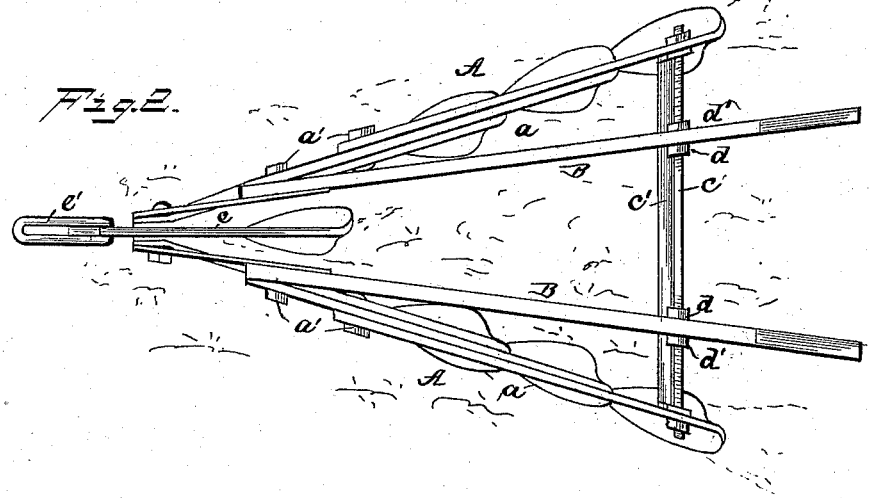
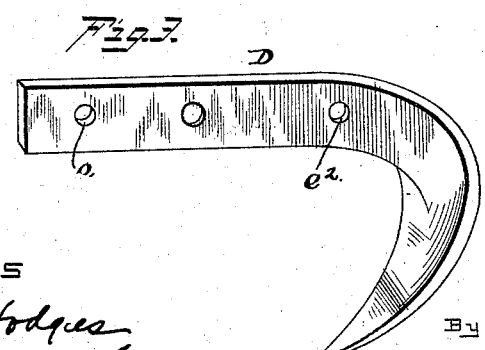
Witnesses
Wm. S. Hodges
D. A. Mullrick
Inventor
J. W. Cason
By Patrick O'Farrell
Attorney.

UNITED STATES PATENT OFFICE.

JAMES WEBB CASON, OF BLACKBURN, LOUISIANA.

HARROW.

SPECIFICATION forming part of Letters Patent No. 488,425, dated December 20, 1892.

Application filed August 3, 1891. Serial No. 401,558. (No model.)

*To all whom it may concern:*

Be it known that I, JAMES WEBB CASON, a citizen of the United States of America, residing at Blackburn, in the parish of Claiborne and State of Louisiana, have invented certain new and useful Improvements in Harrows, of which the following is a specification, reference being had therein to the accompanying drawings.

This invention relates to certain new and useful improvements in harrows, and has for its object the production of a cheap, simple and highly efficient harrow which can be used with equal advantage for harrowing even and uneven soil, and also capable of being used as a straddle row cultivator.

The invention consists in a harrow having two sets or series of teeth pivotally connected together, and a separate or independent tooth designed when in use to occupy a plane above the remaining teeth of the harrow, and capable of being inverted when cultivating even soil or when the harrow is used as a straddle row cultivator, the clevis being connected to said independent tooth in either of its positions.

The invention also comprises the detail construction, combination and arrangement of parts, substantially as hereinafter fully set forth and particularly pointed out in the claims.

In the accompanying drawings:—Figure 1 is a view in side elevation of my improved harrow, showing both positions of the separate or independent tooth. Fig. 2 is a top plan thereof. Fig. 3 is a detail view of one of the teeth.

Referring to the drawings, A, A, designate two sets or series of teeth, each of which consists of a flat bar the upper portion of which normally occupies an approximately horizontal position, the rear lower end of each bar being bent or curved to form a plow point like end $a$, those of each series being faced in the same direction inwardly toward those of the opposite series. The teeth of each series are pivotally connected together by nutted bolts $a'$, so that each tooth is free to move independent of the other. To the forward ends of the front teeth of each series are connected the lower, convergent ends of two handle bars B, B, to which are secured strap irons $b$, through which are passed a nutted bolt $b'$ also passed through coincident holes or apertures in the ends of the front teeth. These handle-bars B are supported at their rear ends by a cross-bar C, which latter is held in position by a U-shape bar C', rigidly secured to the inner sides of the rearmost teeth of each series. The bar C is provided with threaded ends upon which work inner and outer nuts $d, d'$, so that the handle bars can be adjusted and held rigid at the desired points.

D is a separate or independent tooth which is pivotally mounted by bolt $b'$ so as to be free to turn on its bearing. In the forward end of this tooth D is a hole or opening $e$ wherein a clevis, as $e'$, is designed to be inserted when the tooth D is to operate in conjunction with the other or remaining teeth of the harrow. In its normal position the point of tooth D occupies a plane above and intermediate of the forward teeth of the two series. When, however, it is desired to use the harrow on even soil, or as a straddle row cultivator, the tooth D is turned on its pivotal bearing so that the clevis can be inserted through a hole or aperture $e^2$ in the then forward end of the horizontal portion of said tooth, the point of which latter is held elevated out of the way.

From what has been said it will be seen that I have produced a convertible harrow which can be used for harrowing even and uneven soil and also for cultivating growing crops, the same serving as a straddle row cultivator. A harrow thus constructed is extremely simple and easy of operation, and it is also inexpensive, strong and durable.

I claim as my invention:—

1. The herein-described improved harrow, having two sets or series of teeth, said teeth being pivotally connected together, and an independent tooth pivotally mounted between the forward ends of said sets or series and provided with two points of connection for a clevis, whereby said tooth can be turned on its pivotal bearing, substantially as and for the purposes set forth.

2. The herein-described improved harrow, comprising two sets or series of teeth pivotally connected together, the U-shape bar secured to the rearmost teeth of said sets or series, the handle bars connected at their lower forward ends to the front teeth of said sets or series, the threaded rod projected through said handle bars and supported by said U-shape bar and having inner and outer nuts, and the independent tooth pivotally mounted between the forward ends of said sets or series of teeth and provided with two points of connection for a clevis, whereby said tooth can be turned on its pivotal bearing, substantially as and for the purpose set forth.

In testimony whereof I affix my signature in presence of two witnesses.

JAMES WEBB CASON.

Witnesses:
M. NALLE,
W. W. OTTS.